No. 815,744. PATENTED MAR. 20, 1906.
W. H. RICE.
AGRICULTURAL IMPLEMENT.
APPLICATION FILED JULY 20, 1904.
3 SHEETS—SHEET 1.
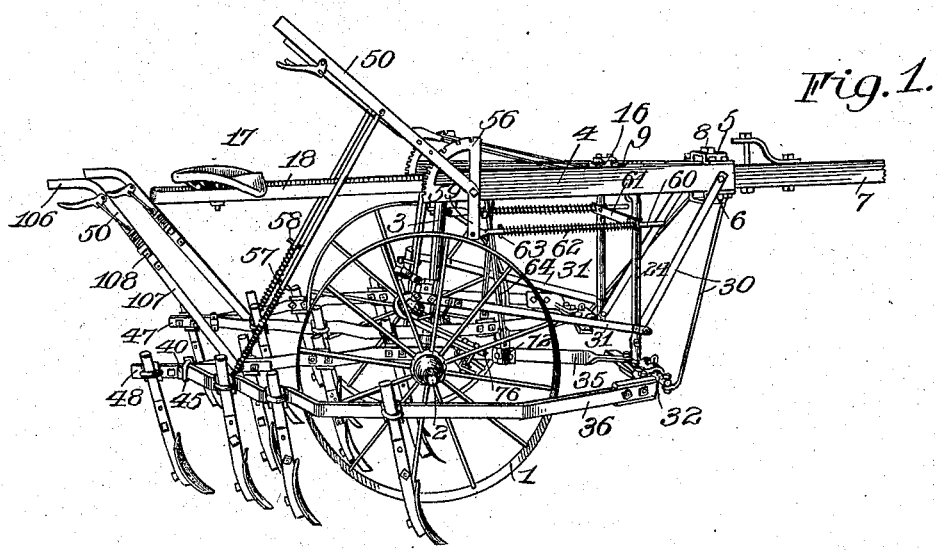
Witnesses.
Russell B. Griffith
Clarence A. Bateman
Inventor.
William H. Rice
by Hudernett Church
his Attorney.

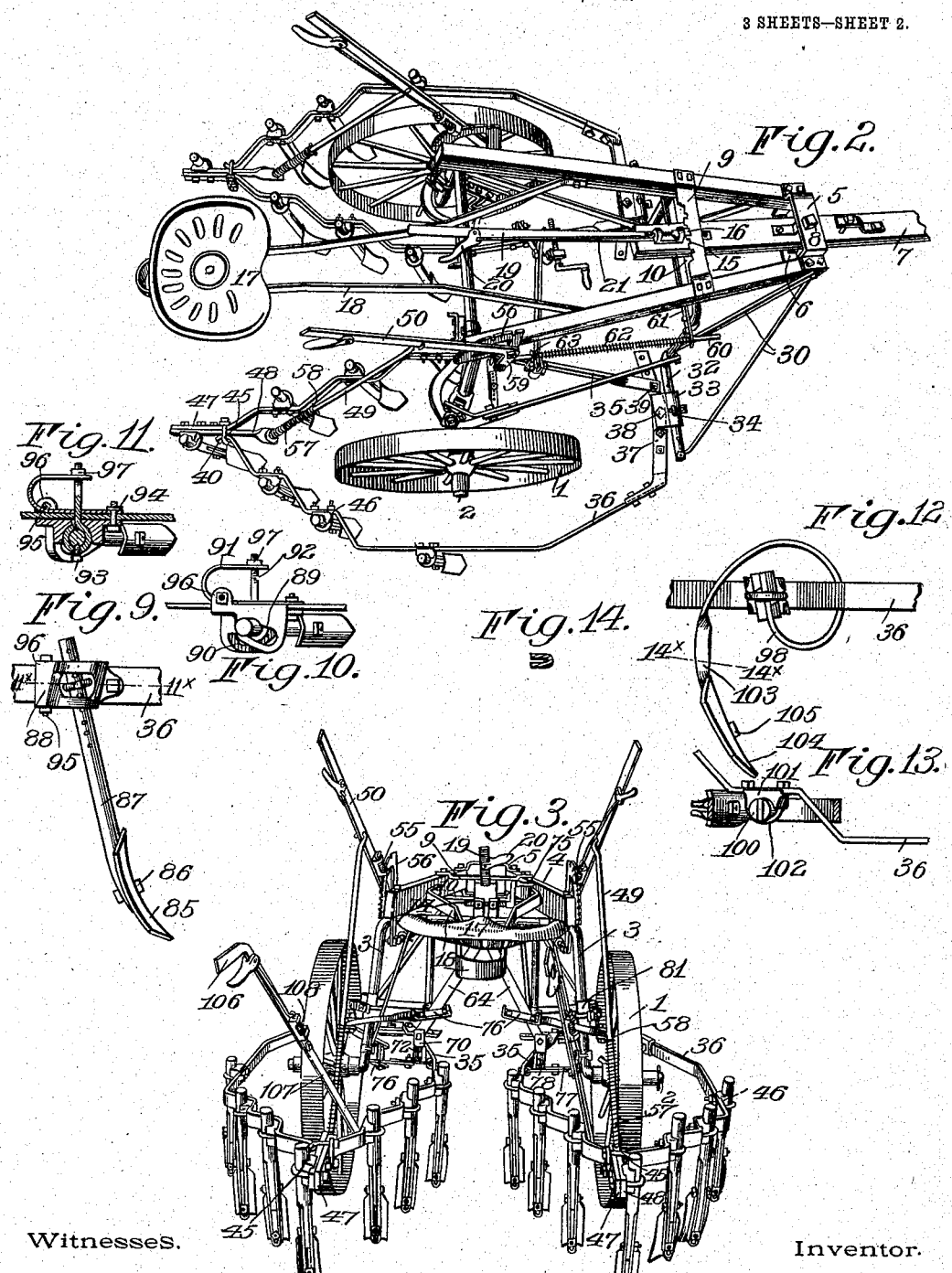

No. 815,744. PATENTED MAR. 20, 1906.
W. H. RICE.
AGRICULTURAL IMPLEMENT.
APPLICATION FILED JULY 20, 1904.
3 SHEETS—SHEET 3.
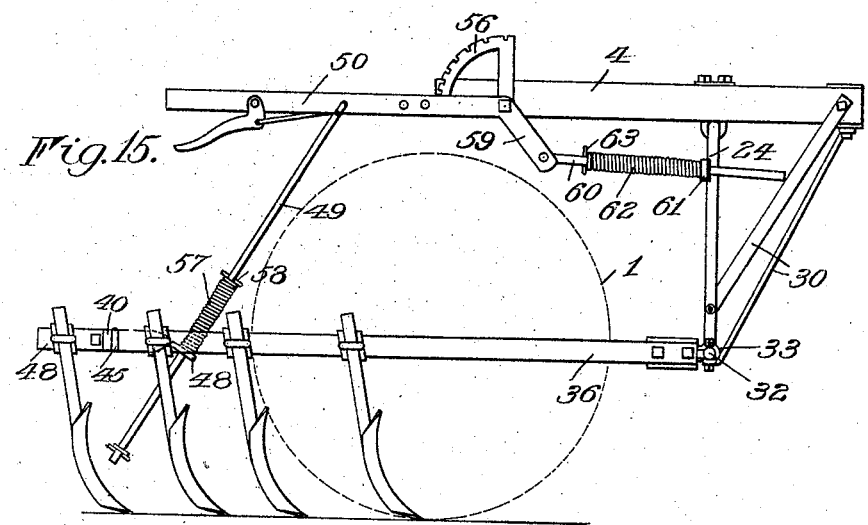
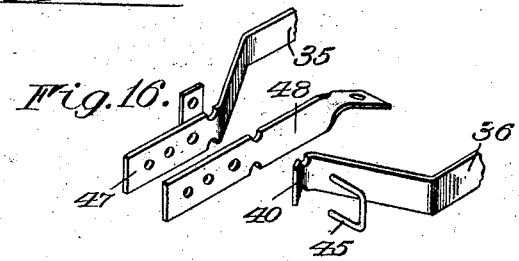
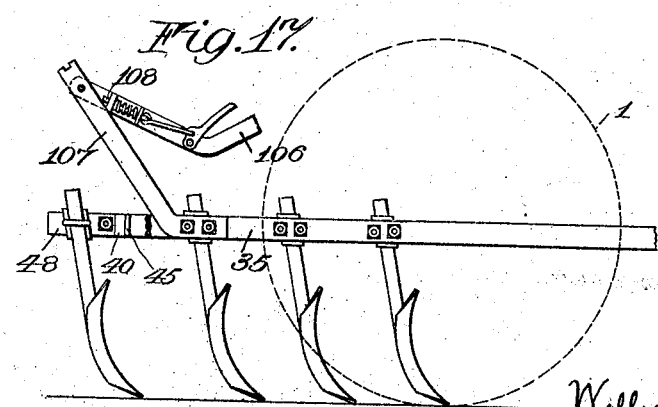
Witnesses
Walter B. Payne
Russell B. Griffith
Inventor
William H. Rice
By
his Attorney

UNITED STATES PATENT OFFICE.

WILLIAM H. RICE, OF ROCHESTER, NEW YORK.

AGRICULTURAL IMPLEMENT.

No. 815,744.  Specification of Letters Patent.  Patented March 20, 1906.

Application filed July 20, 1904. Serial No. 217,412.

*To all whom it may concern:*

Be it known that I, WILLIAM H. RICE, of Rochester, in the county of Monroe and State of New York, have invented certain new and useful Improvements in Agricultural Implements; and I do hereby declare the following to be a full, clear, and exact description of the same, reference being had to the accompanying drawings, forming a part of this specification, and to the reference-numerals marked thereon.

My present invention relates to agricultural implements; and particularly to that class known as "cultivators;" and it has for its object to provide a machine comprising a comparatively narrow frame supporting two or more gang or tool frames which are capable of being opened or closed to vary the width of the cultivated strips of ground and which are also adjustable relatively to vary the distance between the rows cultivated by the tools on each frame.

My invention has for its further object to provide means under the control of the operator for swinging the gang-frames to permit plants or other objects lying in their path to be dodged without altering the general direction of travel of the machine.

To these and other ends my invention consists in certain improvements and combinations of parts, all as will be hereinafter more fully described, the novel features being pointed out in the claims at the end of the specification.

In the drawings, Figure 1 is a side perspective view of an agricultural implement constructed in accordance with my invention. Fig. 2 is a similar view taken from a point above the machine, and Fig. 3 is a rear perspective view thereof. Fig. 4 is an elevation of the adjustable connections between the gang-frames. Fig. 5 is a plan view of one of the foot-adjusting levers, illustrating its attachment to one of the uprights of the carriage-frame and also the adjustable connection between it and the gang-frame. Fig. 6 is a sectional view of the bracket supporting the lever shown in Fig. 5, and Fig. 7 is a perspective view of a modified form of said bracket. Fig. 8 is a detail sectional view illustrating the means for adjusting the draft-tongue. Fig. 9 is a side elevation of one of the tools and the devices employed for connecting it to the gang-frame. Fig. 10 is a top plan view of the parts shown in Fig. 9, and Fig. 11 is a horizontal sectional view on the line $11^\times 11^\times$ of Fig. 9. Fig. 12 is a side elevation of a spring-tooth adapted to be employed on the gang-frames. Fig. 13 is a top plan view thereof. Fig. 14 is a sectional view on the line $14^\times 14^\times$ of Fig. 12. Fig. 15 is a detail view illustrating the operation of the lever for elevating and depressing a gang-frame shown in the latter position. Fig. 16 is a perspective view showing the rear ends of the side pieces of the gang-frames disconnected. Fig. 17 is a detail view showing the guiding-handle for a gang-frame folded in inoperative position.

Similar reference-numerals in the several figures indicate similar parts.

In illustrating the present embodiment of my invention I have shown an agricultural implement of that class generally known as "riding-cultivators," embodying the main frame or carriage supported by the wheels 1, the hubs of which receive the short axles 2, extending outwardly from the vertically-extending upright portions 3 of the frame on which the side portions 4 of the latter are mounted. These side portions converge toward their forward ends, where they are connected by the upper and lower bearing-plates 5 and 6, respectively, between which extends the centrallly-arranged draft-tongue 7, which is capable of being adjusted in a horizontal plane at an angle to the carriage-frame to adapt the machine for working upon a hillside, and it is also adjustable in a vertical plane to enable the machine to be operated in a level position whether drawn by horses of greater or less height. To accomplish these ends, the tongue 7 is supported upon a bolt 8, journaled in the plates 5 and 6, and at its rear end it is supported loosely between the upper and lower cross-bars 9 and 10, extending between the side pieces 4 of the frame, one of said plates being provided with notches 15, with which coöperates a spring-operated dog 16, employed for locking the tongue in adjusted position.

The portions of the machine located forwardly of the axles 2 are counterbalanced by the weight of the operator or driver when he is mounted upon the seat 17, which is adjustably supported upon rearwardly-extending arms 18. Extending into proximity with the seat within convenient reach of the operator is the adjusting arm or handle 19, attached to the rear end of the pole and carrying a short lever-arm 20, connected by a rod 21 with the dog 16, whereby the latter may be retracted when desired. A vertical adjustment of the forward end of the tongue is accomplished by the rotation of the bolt 8, the threads thereon engaging with those of the nuts 22 and 23, arranged at the upper and lower sides of the tongue, whereby the latter may be raised or lowered, as will be understood from an inspection of the illustration shown in Fig. 8.

Extending downwardly from the forward end of the carriage-frame and at each side thereof are standards 24, which are braced at their forward sides by draw-bars 30 and at their rear sides by thrust-rods 31, attached to the uprights 3, which latter they also serve to support. Each of the standards are provided with an outwardly-extending end 32, on which is journaled a clip 33, adjustable longitudinally on said end and retained in position by a cotter-pin 34, a limited rotary movement of the clip being permitted by an elongated aperture therein, through which the pin extends. The gang or tool frames arranged at opposite sides of the machine are alike in construction, and a description of one will suffice for both. These frames are composed of the inner and outer side pieces 35 and 36, respectively, the latter being provided at its forward end with the inwardly-extending perforated portion 37, pivoted between rearwardly-extending lips of the clip 33 by a bolt 38, to which the forward end of the side piece 35 is connected by a bolt 39, whereby said side pieces may be adjusted relatively to vary the width of the gang-frame, said side pieces being pivotally connected at their rear ends by passing the end 40 of one of them beneath a bolt 45 on the other. This bolt 45 is U-shaped, and the sides thereof inclose the side pieces 35 and 36 and lie in small depressions or notches in the edges thereof to prevent its displacement, as will be understood. The gang-frames extend around the wheels, their widest points being located opposite the centers thereof, and toward their rear ends the side portions 35 and 36 approach each other by a series of steps, the bottoms 46 of which extend parallel with the direction of movement of the vehicle, as shown particularly in Figs. 2 and 3. One of the side pieces is provided with a rearwardly-extending end 47, and attached thereto is a plate 48, having its inner end perforated to receive a lifting-rod 49, attached to a lever 50, journaled on the side 4 of the carriage-frame and provided upon its inner side with a dog 55, coöperating with teeth in a segmental rack 56, whereby the lever may be held either in an upright position to elevate the gang-frame or in a substantial horizontal position. A coil-spring 57 surrounds the lifting-rod and is arranged between a pin 58 thereon and a plate 48, so that when the arm is in the last-mentioned position the spring will be compressed to force the frame downwardly.

In order to assist the operator in raising the gang-frame, the lever 50 is provided with an end 59, arranged at an angle thereto, to which is attached a rod 60, guided in an aperture in a plate 61, attached to the standards 24 and surrounded by a coil-spring 62, the ends of which abut against the plate 61 and a pin 63 in the rod and tends to move the arm 50 upwardly into its normal position, as will be understood.

In order to permit the distance between the rows cultivated by the tools on the separate gang-frames to be varied, I provide adjustable connections between them, whereby they may be moved relatively toward and from each other. These connections in the present instance comprise cross-arms 64, pivoted together at the point 65 and connected at their lower ends to blocks 70, having pins 71, journaled in bearings 72, attached to the inner side pieces 35 of each of the gang-frames. At the upper ends of the arms are pivoted threaded heads 73, with which engages a shaft 74, having its opposite ends provided with right and left hand screw-threads, as shown in Fig. 4. The shaft is provided at one end with an operating-handle 75, by means of which it may be rotated, its movement in one direction or the other causing the ends of the arms to be drawn together or separated and a corresponding movement transmitted to the gang-frames. This is an advantageous form of adjusting device, as the cross-arms extending upwardly they may be operated without an operator being required to reach beneath the vehicle-frame, and, further, as the pivotal connection between the arms is located near their upper end only a slight relative adjustment thereof is required to cause a considerable movement of the gang-frames.

To provide means for shifting the gang-frames to enable the operator to cultivate irregular rows without changing the direction of the machine, or to enable the tools to dodge plants, stones, or other obstructions, devices are provided which are controlled by the operator's feet, which are so arranged as to normally form foot-rests. In the present instance these operating devices consist of curved lever-arms 76, which extend around the outer side of the supports 3, being connected at their forward ends to one of the side pieces of their respective gang-frames by overlapping perforated plates 77 and 78, by means of which said frames may be held in any desired normal position, as will be understood. The pivotal points for the levers 76 are formed on the outwardly-extending ears 79 of plates 80, secured to bearing-plates 81, having inner semicircular surfaces adapted to receive the cylindrical faces of the uprights 3 and to be secured to the latter by means of pins 82, entering apertures in the uprights, and U-shaped bolts 83, the ends of which also pass through the rear ends of the thrust-rods 31, all as shown in Fig. 6. This arrangement I deem to be a preferable construction, although, if it is desired, the bracket and the bearing-plate may be formed of a single piece, as shown in Fig. 7, and the latter provided with a short perforated arm 84, which may be connected in any suitable manner with the thrust-rod 31. This arrangement of the bearings for the arms at the outer sides of the uprights is an advantageous one, as the length of the levers is thereby increased, and, further, by locating their pivotal points above the gang-frames they may be inclined slightly, as shown, so that the operator in pushing against them moves his feet in the natural downward and forward direction.

Various forms of tools may be employed on the gang-frames, and in Figs. 9, 10, and 11 I have illustrated a form of connection which is devised particularly for mounting the tools whereby they may readily free themselves when engaging impediments lying in their paths. The tool consists of a shoe 85, removably attached, by means of a bolt 86, to the shank 87, the end of which coöperates with a seat 88, attached to the side of the gang-frame. At its upper and lower sides the seat is provided with relatively inclined cam-slots 89 and 90, extending relatively in opposite directions, as shown in Fig. 10, and the tool-shank 87 is held in engagement with the inner sides of the slots by means of a spring 91, operating on the bolt 92, having a loop or eye encircling the shank and secured thereto by a screw 93, permitting the tool to be adjusted vertically. The spring 91 is preferably formed of a flat strip of metal, the end or body portion of which is secured by a bolt 94, passing through the seat 88 and also through the gang-frame, and it is further secured beneath a bolt 95, passing through ears 96, extending rearwardly over opposite sides of the supporting portion of the gang-frame and the spring. The tension of the latter may be adjusted by the movement of the nut 97 on the bolt 92. From this arrangement of the parts it will be seen that if the tool 85 engages an obstruction the forward movement of the gang-frame will cause the shank to be rotated on the bolt 92, the relatively arranged cam-slots located at opposite sides of the pivot-point causing the shank to move laterally on its seat, placing the spring 91 under tension, so that when a tool has passed the obstruction it will be returned to its normal position.

It is frequently desirable to employ spring-teeth for certain classes of work, and in Figs. 12 and 13 I have illustrated such a tooth adapted particularly to be employed upon this machine. The body portion of the tooth is constructed of flat spring metal bent in a spiral form and having its attaching end 98 secured between semicircular bushings or clamping-plates 100, resting against the corresponding face of a seat 101, the seat, tool, and clamping-plates being secured to the gang-frame by a U-shaped bolt 102. The spiral shape of the body portion of the tooth lends the desired elasticity thereto, while near its lower end it is stiffened by bending or flattening the material transversely, as indicated at 103 and illustrated particularly in the sectional view shown in Fig. 14. At the lower end of the tool is a removable shoe 104, attached by a bolt 105.

Inasmuch as it is frequently desirable to operate the machine when the operator is walking in rear thereof, I provide the gang-frames with guiding-handles 106, pivoted to short arms or brackets 107, attached to the side portions 35 of the gang-frames and held in operative position by latches 108, which may be disengaged to permit the handles to be folded in the inoperative position, if desired.

An agricultural implement constructed in accordance with my invention embodying gang or tool frames surrounding the wheels, the sides of which may be adjusted to vary their width and which are also movable relatively to each other, adapt the machine for extensive use, as it may be employed for many of the various conditions encountered in cultivating operations.

I claim as my invention—

1. In an agricultural implement, the combination with a carriage embodying wheels, a frame supported thereon and draft appliances, of standards on the frame in front of the wheels, gang-frames surrounding the latter comprising relatively adjustable side pieces and means for adjusting said gang-frames relatively to each other on the standards and tools mounted on said frames.

2. In an agricultural implement, the combination with a carriage embodying wheels, a frame supported thereon and draft appliances, of standards on the frame having horizontally-extending ends projecting in front of the wheels, clips thereon adjustable laterally relatively to each other, gang-frames surrounding the wheels having relatively adjustable side pieces, clips on the ends of the standards attached to the gang-frames and tools on the latter.

3. In an agricultural implement, the combination with a carriage embodying wheels, a frame supported thereon and draft appliances, of standards on the frame having horizontally-extending ends, clips thereon adjustable laterally relatively to each other and gang-frames pivoted to the clips, each of said frames comprising relatively adjustable side pieces, tools thereon and an adjustable connection between said frames for swinging them relatively toward and from each other.

4. In an agricultural implement, the combination with a carriage-frame embodying wheels, draft appliances thereon and depending standards having laterally-extending ends, of clips journaled on said ends, gang-frames comprising side pieces surrounding the wheels and journaled on the clips and means for adjusting said gangs relatively.

5. In an agricultural implement, the combination with a carriage-frame embodying wheels, draft appliances thereon and depending standards having laterally-extending ends, of clips journaled on said ends having rearwardly-extending lips, gang-frames surrounding the wheels and journaled on said lips and means for adjusting said gangs.

6. In an agricultural implement, the combination with a carriage embodying a frame having wheels thereon and draft appliances, of a standard on the frame having a horizontally-extending end, a gang-frame having a bar extending in rear of the end of the standard, and a clip embracing the latter and extending over the bar and pivotally connected thereto.

7. In an agricultural implement, the combination with a carriage embodying wheels, a frame supported above them and draft appliances, of gang-frames arranged beneath the carriage-frame at each side thereof, each frame comprising relatively adjustable side pieces surrounding the wheels, and pivotally connected to the frame, arms pivotally attached at their lower ends to the gang-frames and extending upwardly into proximity with the carriage-frame, means for operating the arms to swing said frames relatively and tools carried on the latter.

8. In an agricultural implement, the combination with a carriage embodying wheels, a frame supported thereon and draft appliances and standards on the frame and extending in front of the wheels, of gang-frames composed of inner and outer side pieces extending around the wheels, said side pieces being adjustable relatively to each other at their forward ends, clips for connecting said frames to the standards and tools carried on the frames.

9. In an agricultural implement, the combination with a carriage embodying wheels, a frame supported thereon and draft appliances and standards on the frame having laterally-extending ends projecting in front of the wheels, of gang-frames composed of inner and outer side pieces connected at their rear ends and adjustable relatively to each other at their forward ends, clips journaled on the ends of the standards and connected to the forward ends of said frames and tools carried on the latter.

10. In an agricultural implement, the combination with a carriage embodying wheels, a frame supported thereon and draft appliances and standards on the frame having laterally-extending ends projecting in front of the wheels, of gang-frames composed of inner and outer side pieces yieldingly connected at their rear ends and adjustable relatively to each other at their forward ends, clips journaled on the ends of the standards and adjustable longitudinally thereon, means for securing the clips in adjusted position, rearwardly-extending gang-frames attached to the clips and tools carried on said frames.

11. In an agricultural implement, the combination with a carriage embodying wheels, a frame supported thereon and draft appliances and standards on the frame, of gang-frames composed of inner and outer side pieces surrounding wheels, pivotal connections between the rear ends of the side-pieces and means at their forward ends for adjusting them relatively to each other to vary the width of the gang-frames, tools carried by said frames and devices for connecting them to the standards.

12. In an agricultural implement, the combination with a carriage embodying wheels, a frame supported thereon and draft appliances and standards on the frame, of a gang-frame composed of separate inner and outer side pieces surrounding wheels, a clip yieldingly connecting said pieces at their rear ends and means for adjusting their forward ends relatively to each other, tools carried on said frame and a device for connecting the latter to the standard.

13. In an agricultural implement, the combination with a carriage embodying wheels, a frame supported thereon and draft appliances and standards on the frame, of a gang-frame composed of separate relatively adjustable inner and outer side pieces provided with a plurality of offsets or steps pivotally connected at their rear ends, one of said pieces being provided with an end extending rearwardly of the other piece, tools having shanks secured to said steps and to said rearwardly-extending end and a device connecting the frame to the standard.

14. In an agricultural implement, the combination with a carriage embodying wheels, a frame having uprights, axles carried thereon and supported in the wheels and draft appliances attached to the frame, of swinging gang-frames arranged beneath the sides of the frame, lever-arms journaled in an inclined position on the uprights and attached to the gang-frames and tools carried on said frames.

15. In an agricultural implement, the combination with a carriage embodying wheels, a frame supported thereon having uprights and draft appliances attached to the frame, of swinging gang-frames carrying tools arranged beneath the sides of the frame, foot-levers attached to the gang-frames and journals supporting the levers in an inclined position on the uprights.

16. In an agricultural implement, the combination with a carriage embodying wheels, a frame supported thereon having uprights and draft appliances attached to the frame, of swinging gang-frames arranged beneath the sides of the frame, brackets on the uprights, curved levers surrounding the uprights and supported on the brackets, connections between said levers and their respective frames and tools carried on the latter.

17. In an agricultural implement, the combination with a carriage embodying wheels, a frame supported thereon having uprights at the sides thereof and draft appliances, of swinging gang-frames arranged beneath the sides of the frame, brackets on the outer sides of the uprights and arms extending around the latter and pivoted on the brackets, adjustable connections between the gang-frames and the proximate ends of the arms, foot-rests on the other ends of the arms and tools carried on the frames.

18. In an agricultural implement, the combination with a carriage embodying wheels, a frame supported thereon and draft appliances, of gang-frames attached to the carriage having tools thereon, brackets on the frames and rearwardly-extending handles pivotally connected to the brackets and latches on the handles, coöperating with the ends of the brackets for locking them in operative position.

19. The combination with a support, of a seat thereon having an open recess extending substantially in a vertical direction, of a tool having a shank provided with a flattened end extended lengthwise of said seat, clamping-plates fitting opposite sides of said end and a device for clamping said plates and shank to the seat.

20. The combination with a support and a seat thereon, having a semicircular recess, of a tool having a shank provided with a flattened end extending edgewise from the bottom of said recess, segmental clamping-plates fitting opposite sides of said end and adapted to fit the recess in the seat and a U-shaped bolt clamping said plates and shank to the seat.

21. The combination with a support, of a seat thereon having a recess and a tool having a shank provided with a flattened end disposed edgewise in the seat, of segmental clamping-plates fitting the sides of said end and a U-shaped bolt clamping said plates and tool in the recess in the seat and securing the latter on the support.

22. A tool for agricultural implements comprising a body of flat metal bent into a spiral form, one end of which forms a shank and the other being stiffened by being bent into a U shape, said portion lying in a plane extending transversely of the body and a removable shoe attached to said end.

23. In an agricultural implement, the combination with a carriage embodying wheels, a frame supported thereon and draft appliances, of a gang-frame movably supported on the carriage-frame having tools thereon, a lever pivoted on the carriage-frame, a lifting-rod connected to the lever and coöperating with the gang-frame and a spring contracted by the movement of lever in one direction and operating extensibly to move it in a direction to raise the gang-frame.

24. In an agricultural implement, the combination with a carriage embodying wheels, a frame supported thereon and draft appliances, of a gang-frame movably supported on the carriage-frame having tools thereon, a lever pivoted on the carriage, a lifting-rod attached to the lever at one side of its pivot and coöperating with the gang-frame, a spring compressed by the movement of the lever in one direction and operating extensibly on the lever at the other side of its pivot to move it in a direction to raise the gang-frame and a spring bearing on the gang-frame and operated by the lifting-rod to yieldingly move the gang-frame downwardly.

25. In an agricultural implement, the combination with a carriage embodying wheels and a frame having draft appliances thereon, of gang-frames composed of relatively adjustable side pieces surrounding the wheels, connections between the gang-frames and the carriage-frame located in front of the wheels, said connections being adjustable relatively toward and from each other independently of the wheels and tools carried by the gang-frames.

26. In an agricultural implement, the combination with a carriage embodying wheels, a frame supported above them and draft appliances, of gang-frames arranged beneath the carriage-frame at each side thereof surrounding the wheels and pivotally connected to the carriage-frame, and means connected to said frames for swinging them relatively and tools carried on the frames.

27. In an agricultural implement, the combination with a carriage embodying wheels, a frame supported thereon having draft appliances, of gang-frames composed of inner and outer side pieces surrounding the wheels, pivotal connections between the rear ends of the side pieces and means at their forward ends for adjusting them relatively to each other, to vary the width of the gang-frames, tools carried by said frames and devices pivotally connecting them to the carriage-frame.

28. In a tool for agricultural implements, comprising a spirally-shaped body portion constructed of flat metal having one end forming an attaching-shank and its opposite end provided with a working point and flattened in a U shape above the point, said portion extending in a direction transversely of the body.

WILLIAM H. RICE.

Witnesses:
G. WILLARD RICH,
RUSSELL B. GRIFFITH.